(12) United States Patent
Yao et al.

(10) Patent No.: US 8,167,464 B2
(45) Date of Patent: May 1, 2012

(54) BACKLIGHT MODULE AND LIGHT EMITTING DIODE THEREOF

(75) Inventors: Yuan-Jung Yao, Hsin-Chu (TW); Yun-Yi Tien, Hsin-Chu (TW); Chih-Lin Wang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 222 days.

(21) Appl. No.: 12/612,068

(22) Filed: Nov. 4, 2009

(65) Prior Publication Data
US 2010/0142221 A1 Jun. 10, 2010

(30) Foreign Application Priority Data
Dec. 5, 2008 (TW) .............................. 97147467 A (51) Int. Cl.
*F21V 5/00* (2006.01)
*F21V 3/00* (2006.01)
*F21V 5/04* (2006.01)
*F21V 7/04* (2006.01)

(52) U.S. Cl. .................. 362/331; 362/244; 362/311.03; 362/311.08; 362/608; 362/332

(58) Field of Classification Search .................. 362/331, 362/311.03, 332, 335–338, 612, 244, 311.08, 362/296.06, 608, 311.02
See application file for complete search history.

(56) References Cited

U.S. PATENT DOCUMENTS

| | | | | |
|---|---|---|---|---|
| 4,638,343 A | * | 1/1987 | Althaus et al. .................. | 257/98 |
| 5,289,082 A | * | 2/1994 | Komoto ........................ | 313/500 |
| 7,422,347 B2 | * | 9/2008 | Miyairi et al. ................. | 362/335 |
| 7,625,102 B2 | * | 12/2009 | Koike et al. .................... | 362/277 |
| 7,837,360 B2 | * | 11/2010 | Lee ................................. | 362/335 |
| 7,901,113 B2 | * | 3/2011 | Kim et al. ...................... | 362/328 |
| 2006/0083000 A1 | | 4/2006 | Yoon et al. | |
| 2007/0091615 A1 | * | 4/2007 | Hsieh et al. .................... | 362/335 |
| 2008/0062715 A1 | * | 3/2008 | Park et al. ...................... | 362/612 |
| 2008/0151550 A1 | | 6/2008 | Liu et al. | |
| 2011/0063874 A1 | * | 3/2011 | Yatsuda et al. ................. | 362/612 |

FOREIGN PATENT DOCUMENTS

| | | |
|---|---|---|
| CN | 1885128 | 12/2006 |
| CN | 101206346 A | 6/2008 |
| JP | 2001-60724 A | 3/2001 |
| TW | I244778 | 12/2005 |
| TW | I261654 | 9/2006 |
| TW | 200720781 A | 6/2007 |
| TW | 2008-34174 | 8/2008 |
| TW | I313775 | 8/2009 |

OTHER PUBLICATIONS

English language translation of abstract of TW I244778 (published Dec. 1, 2005).

(Continued)

*Primary Examiner* — Jong-Suk (James) Lee
*Assistant Examiner* — David J Makiya
(74) *Attorney, Agent, or Firm* — Thomas, Kayden, Horstemeyer & Risley, LLP (57) ABSTRACT

A light emitting diode contains a light emitting diode chip and a light directing structure disposed thereon. The light directing structure has a pair of connected hemi-ellipsoids and an interface interposed therebetween. Each hemi-ellipsoid comprises a bottom surface in a shape of an incomplete ellipse and an ellipsoidal surface connected to the bottom surface and the interface, wherein the largest vertical distance from the ellipsoidal surface to the bottom surface is longer than a height of the interface. The bottom surface has a major axis and a minor axis intersected to define a center, wherein the interface is connected to the minor axis.

22 Claims, 8 Drawing Sheets

OTHER PUBLICATIONS

English language translation of abstract of TW I261654 (published Sep. 11, 2006).

English language translation of abstract of TW 2008-34174 (published Aug. 16, 2008).

English language translation of abstract of TW I313775 (published Aug. 21, 2009).

English language translation of abstract of CN 1885128 (published Dec. 27, 2006).

English translation of abstract and pertinent parts of JP 2001-60724 A.

English translation of abstract and pertinent parts of TW 200720781 A.

English translation of abstract and pertinent parts of CN 101206346 A.

* cited by examiner

BACKLIGHT MODULE AND LIGHT EMITTING DIODE THEREOF

RELATED APPLICATIONS

This application claims priority to Taiwan Application Serial Number 97147467, filed Dec. 5, 2008, which is herein incorporated by reference.

BACKGROUND

1. Field of Invention

The present invention relates to a backlight module. More particularly, the present invention relates to a light emitting diode.

2. Description of Related Art

A backlight module is one of the most important parts of a liquid crystal display (referred to as LCD). Since the liquid crystal is not a luminous body, the LCD panel is illuminated by the backlight module. The backlight module typically includes a light source, a light guide plate and many optical films such as, diffuser and reflector. Among all kinds of light sources of the backlight module, a light emitting diode (referred to as LED) has gradually become the most popular light source because of the high brightness, long lifetime, small size, and low energy consumption properties.

Nowadays, the luminous intensity of the LED has been improved, which means the desired luminance of the backlight module can be achieved with fewer LEDs. Fewer LEDs lowers the cost of the backlight module.

Figure 1A:
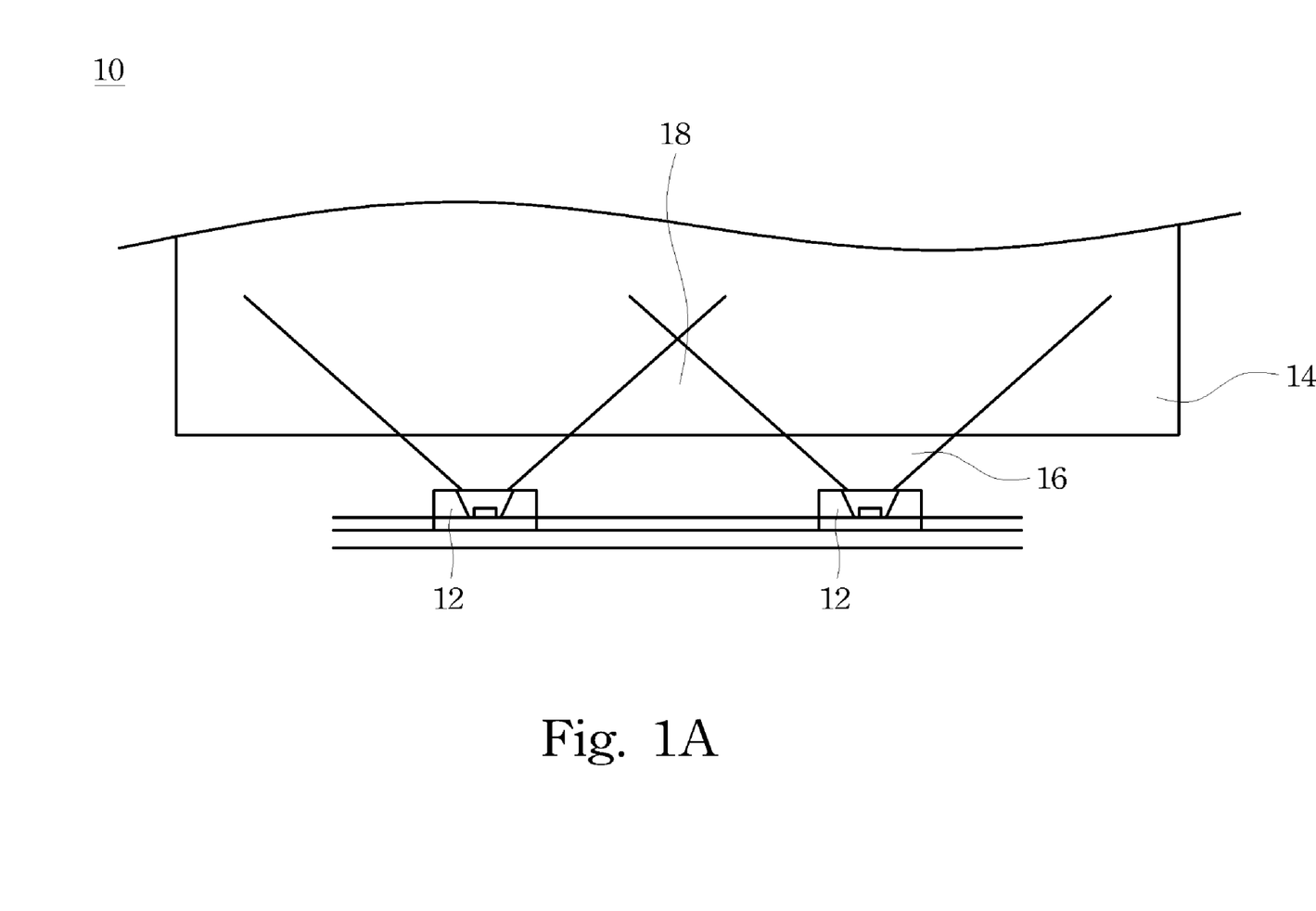
FIG. 1A is a top view of a conventional backlight module.

Please refer to FIG. 1A. FIG. 1A is a top view of a conventional backlight module 10, and FIG. 1A shows light distribution in a horizontal direction. When fewer LEDs 12 are used, the gap between LEDs 12 is wider. If the light field, or the light strength, in large angle of the light 16 emitted from the LED 12 is not enough to cover the wider gap, a dark strip 18 will be formed in the gap, and furthermore, non-uniform light may be provided to the LCD panel.

Figure 1B:
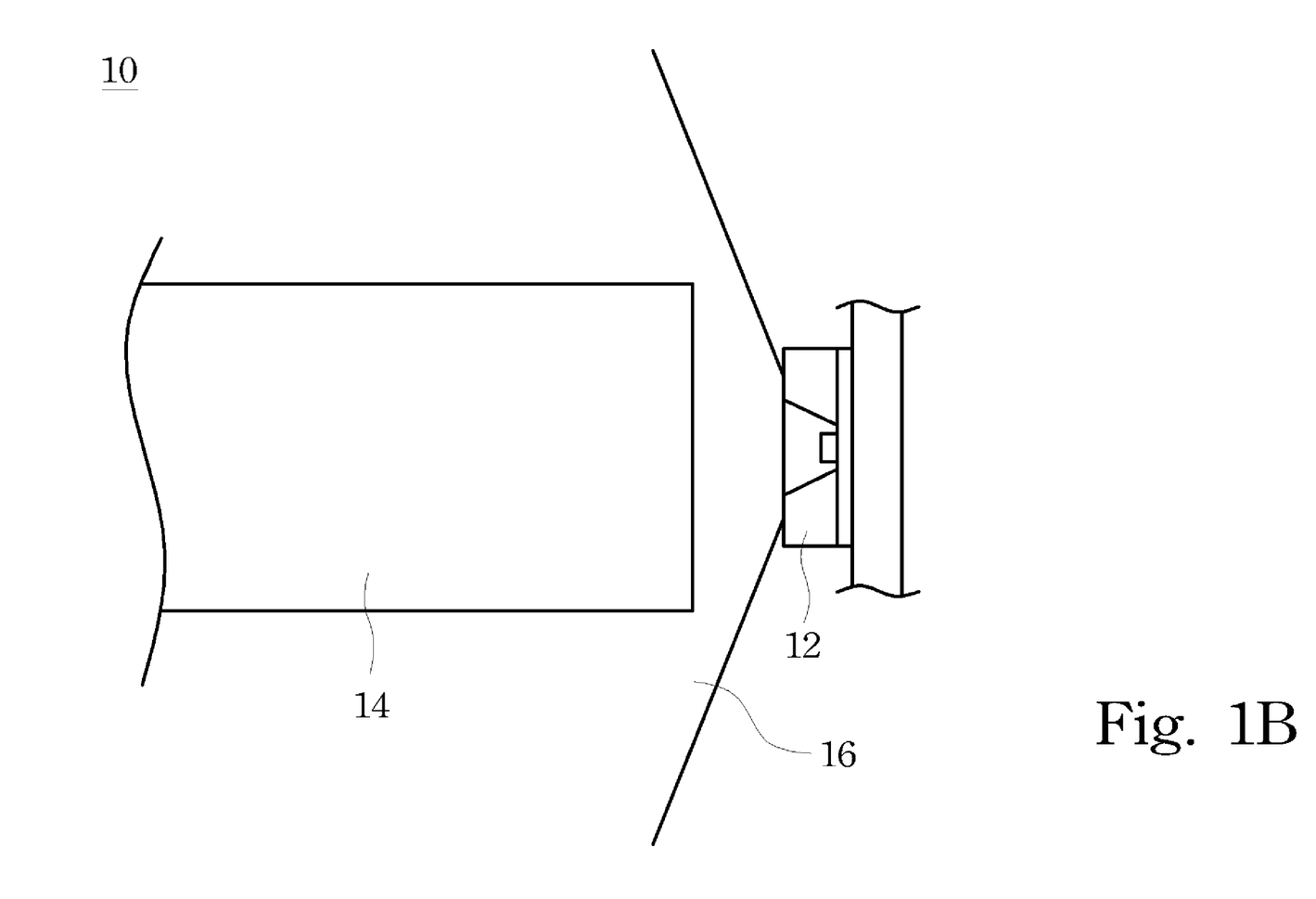
FIG. 1B is a side view of a conventional backlight module.

In addition, electronic devices are becoming thinner and lighter, so it is necessary to thin the LCD as well. Please refer to FIG. 1B. FIG. 1B is a side view of the conventional backlight module 10, and FIG. 1B shows light distribution in a vertical direction. As the LCD 12 becomes thinner, the backlight module 10 and the light guide plate 14 thereof also become thinner. When the thickness of the light guide plate 14 is almost as small as the thickness of the LED 12, the angular distribution of light field of the LED 12 in the vertical direction may be too broad and some of light 16 may leak out from the light guide plate 14, which may create light leakage problems.

Therefore, a new backlight module and a new LED thereof are necessary. The new LED may have different angular distribution of light field in different directions. In a horizontal direction, the light field should be enough at a large angle to prevent generating dark strips. In the vertical direction, the light field should be limited to small angles to ensure that each light beam is incidence on the light guide plate to prevent light leakage problems.

SUMMARY

A light emitting diode (referred to as LED) with different light fields in horizontal and vertical directions is provided. The LED comprises a light emitting diode chip (referred to as LED chip) and a light directing structure disposed on the LED chip. The light directing structure comprises a pair of connected hemi-ellipsoids and an interface interposed therebetween. Each hemi-ellipsoid comprises a bottom surface and an ellipsoidal surface. The bottom surface is in a shape of an incomplete ellipse, which has a major axis and a minor axis intersected to define a center, wherein the interface is connected to the minor axis. The ellipsoidal surface is connected to the bottom surface and the interface. The largest vertical distance from the ellipsoidal surface to the bottom surface is longer than the largest height of the interface.

The shape of the light directing structure may affect the distribution of light field of the LED, especially the angular distribution of light field. The angular distribution of light field may be broader along the direction of the major axis of each bottom surface, and the angular distribution of light field may be smaller along the direction of the minor axis of the bottom surface.

Additionally, this invention also provides a backlight module. The backlight module comprises a light guide plate and an LED adjacent to the light guide plate. The LED has an LED chip and a light directing structure disposed thereon. The shape and the displacement of the light directing structure may cause a larger angular distribution of light field in a horizontal direction and a smaller angular distribution of light field in a vertical direction.

In particular, the light directing structure disposed on the LED chip and interposed between the LED chip and the light guide plate. The light directing structure comprises a pair of connected hemi-ellipsoids and an interface interposed therebetween. Each hemi-ellipsoid comprises a bottom surface and an ellipsoidal surface connected to the bottom surface and the interface. The bottom surface is in a shape of an incomplete ellipse, which has a major axis and a minor axis intersected to define a center, wherein the interface is connected to the minor axis. The largest vertical distance from the ellipsoidal surface to the bottom surface is longer than the largest height of the interface.

In the foregoing, the light directing structure may direct light emitted from the LED chip and change the angular distribution of light field in different direction. In the direction of the major axis of each bottom surface, the light field of large angle may be increased to prevent dark strip. In the direction of the minor axis, the light field may be limited to a small angle, which may prevent light leaking out of the light guide plate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 2:
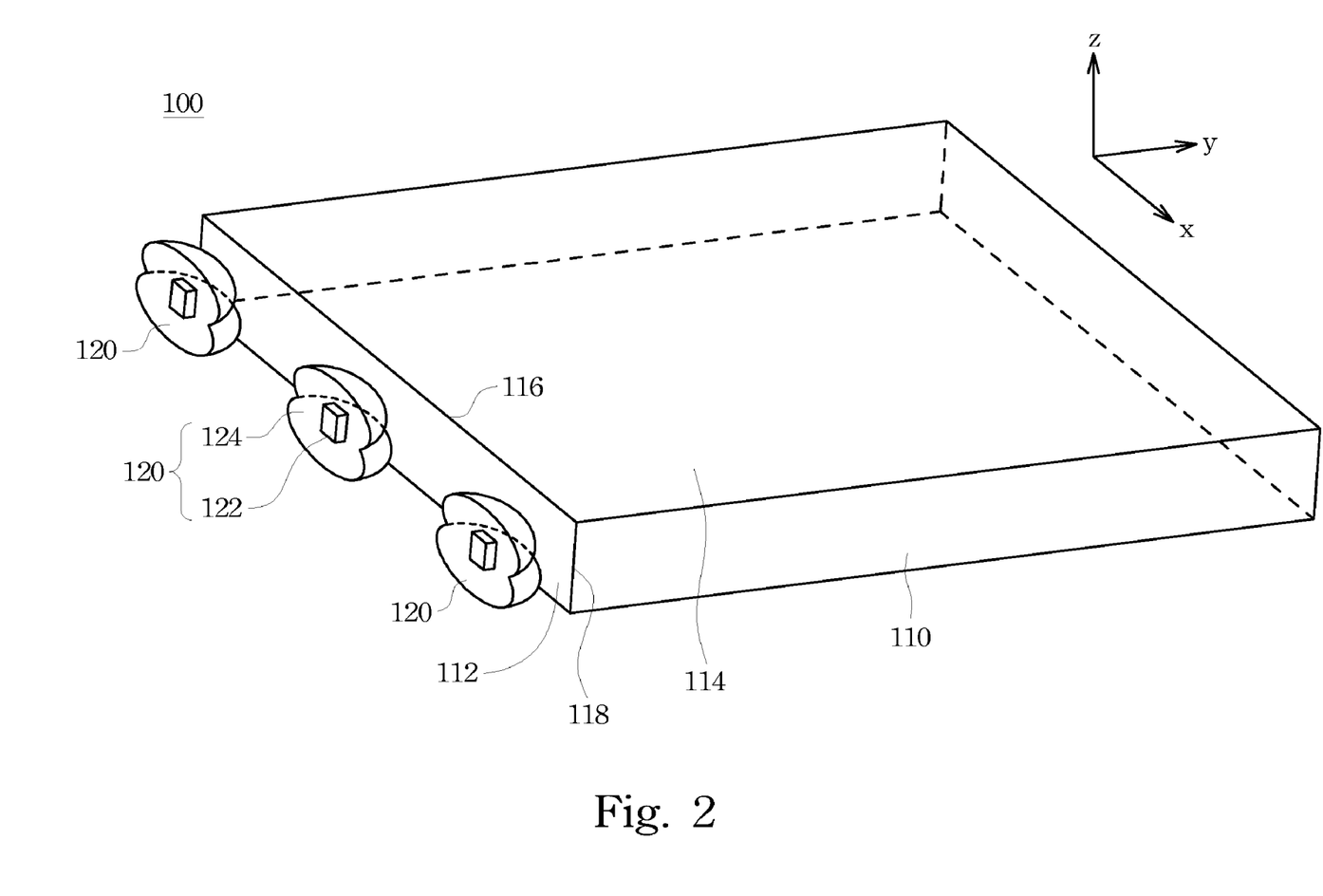
FIG. 2 is a perspective view of a backlight module according to an embodiment of this invention.

Please refer to FIG. 2. FIG. 2 is a perspective view of a backlight module 100 according to an embodiment of this invention. The backlight module 100 supplies light for the liquid crystal display (referred to as LCD). In the embodiment of this invention, the backlight module 100 at least contains light emitting diodes (referred to as LEDs) 120 and a light guide plate 110. The light guide plate 110 is adjacent to the LEDs 120. The light guide plate 110 may guide light emitted from the LEDs 120 to a panel (not shown) of the LCD.

Each LED 120 includes a light emitting diode chip (referred to as LED chip) 122 and a light directing structure 124 disposed on the LED chip 122. In the embodiment of this invention, the LED chip 122 is embedded in the light directing structure 124.

The light directing structure 124 is interposed between the LED chip 122 and the light guide plate 110. The light directing structure 124 may spread light emitted from the LED chip 122 to the light guide plate 110. The shape and the displacement of the light directing structure 124 may cause different angular distributions of light field in a horizontal direction and a vertical direction. The horizontal direction is parallel to a longer side 116 of an incidence plane 112 on the light guide plate 110, which is a direction of an X-axis shown in FIG. 2. The vertical direction is parallel to a shorter side 118 of the incidence plane 112, which is a direction of a Z-axis shown in FIG. 2.

Figure 3A:
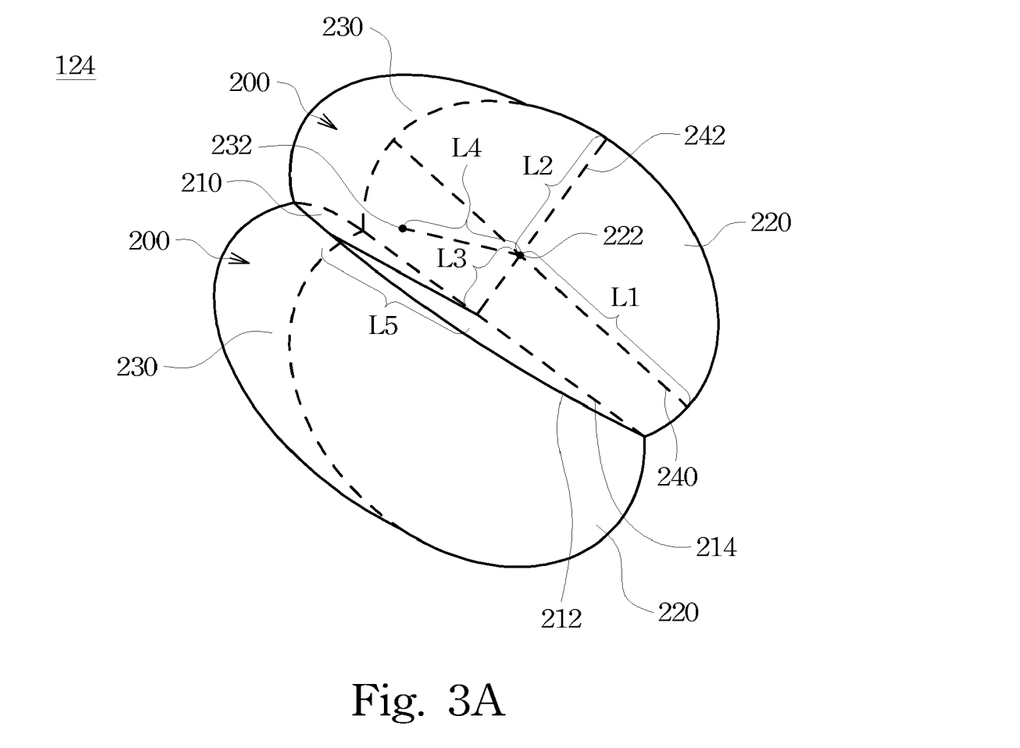
FIG. 3A is a perspective view of the light directing structure shown in FIG. 2.
Figure 3B:
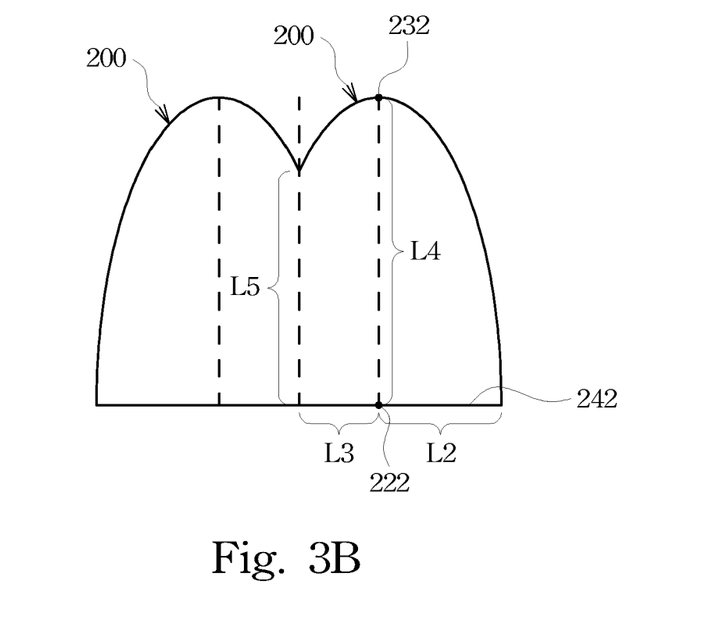
FIG. 3B is a cross-sectional view of the light directing structure shown in FIG. 3A.

Please refer to FIG. 2, FIG. 3A and FIG. 3B at the same time. FIG. 3A is a perspective view of the light directing structure 124. FIG. 3B is a cross sectional view of the light directing structure 124 along a minor axis 242. The light directing structure 124 comprises a pair of connected hemi-ellipsoids 200 and an interface 210 interposed therebetween. In other words, the hemi-ellipsoids 200 are connected to two opposite sides of the interface 210, respectively.

In the embodiment of this invention, the hemi-ellipsoids 200 are mirror symmetric and the interface 210 is the plane of symmetry. One of the hemi-ellipsoid 200 is the mirror image of the other.

Each hemi-ellipsoid 200 comprises a bottom surface 220 and an ellipsoidal surface 230. The bottom surface 220 is in a shape of an incomplete ellipse having a major axis 240 and a minor axis 242, wherein the major axis 240 is longer than the minor axis 242. The major axis 240 and the minor axis 242 are intersected to define a center 222. In general, an ellipse can use its major axis 240 and minor axis 242 to determine its curvature.

In the embodiment of this invention, each one of the bottom surfaces 220 is mirror symmetric and the minor axis 242 is the line of symmetry. In particular, the bottom surface 220 is divided into two parts by the minor axis 242. One of the two parts is the mirror image of the other.

In the embodiment of this invention, the interface 210 connects the bottom surface 220. The interface 210 connects to the minor axis 242. In the embodiment, the interface 210 is substantially perpendicular to the bottom surface 220.

The ellipsoidal surface 230 connects the interface 210 and the bottom surface 220. In particular, the interface 210 and the bottom surface 220 are connected, and the edge of the ellipsoidal surface 230 connects all edges of the interface 210 and the bottom surface 220. The ellipsoidal surface 230 is a convex and the center of the ellipsoidal surface 230 is away from the center 222 on the bottom surface 220. The largest vertical distance from the ellipsoidal surface 230 to the bottom surface 220 is the distance from a top point 232 on the ellipsoidal surface 230 to the center 222, which is the height of the light directing structure 124.

The light directing structure 124 is disposed on the LED chip 122. In a preferred embodiment of this invention, the LED chip 122 is embedded in the light directing structure 124. The LED chip 122 is disposed on the bottom surface 210. More specifically, the LED chip 122 is disposed at where the bottom surface 220 connected the interface 210. In the embodiment of this invention, the LED chip 122 is disposed in the center of the bottom of the light directing structure 124, where the minor axes 242 of two hemi-ellipsoids 200 connects each other.

Please refer to FIG. 3A and FIG. 3B. Each hemi-ellipsoid 200 has a first distance L1, which is a distance from the center 222 on the bottom surface 220 to the edge of the bottom surface 220 along the major axis 240, and a second distance L2, which is a distance from the center 222 to the edge of the bottom surface 220 along the minor axis 242. Each hemi-ellipsoid 200 further has a third distance L3, which is the shortest distance from the center 222 to the interface 210. In the embodiment of this invention, the third distance L3 is the distance from the center 222 to the interface 210 along the minor axis 242.

Each hemi-ellipsoid 200 further has a fourth distance L4, which is the largest vertical distance from the ellipsoidal surface 230 to the bottom surface 220. In the embodiment of this invention, the fourth distance L4 is a distance from the top point 232 on the ellipsoidal surface 230 to the center 222 on the bottom surface 220.

A fifth distance L5 is the largest height of the interface 210. In particular, the ellipsoidal surface 230 connects a first side 212 of the interface 210, and the bottom surface 220 connects a second side 214 of the interface 210. The fifth distance L5 is the largest distance between the first side 212 and the second side 214. In the embodiment of this invention, the fifth distance L5 is from an intersected point of the minor axis 242 and the second side 214 to the first side 212 along a direction perpendicular to the second side 214.

The largest vertical distance from the ellipsoidal surface 230 to the bottom surface 220 is longer than the height of the interface 210, which means the fourth distance L4 is longer than the fifth distance L5. Therefore, the top point 232 of each hemi-ellipsoid 200 is higher than the interface 210, and the cross sectional view of the light directing structure 124 as shown in FIG. 3B is like a letter m.

The first distance L1 is longer than the second distance L2, which means the distance from the center 222 to the edge of the bottom surface 220 along the major axis 240 is longer than the distance from the center 222 to the edge of the bottom surface 220 along the minor axis 242. In a preferred embodiment, the first distance L1 is longer than or equal to twice of the second distance L2 to have a better light distribution. In the embodiment of this invention, the first distance L1 is about equal to twice of the second distance L2.

The fourth distance L4 is longer than the second distance L2, which means the largest vertical distance from the ellipsoidal surface 230 to the bottom surface 220 is longer than the distance from the center 222 to the edge of the bottom surface 220 along the minor axis 242. In a preferred embodiment, the fourth distance L4 is longer than or equal to twice of the second distance L2 to have a better light distribution. In the embodiment of this invention, the fourth distance L4 is about equal to twice of the second distance L2. The fourth distance L4 can be equal to the first distance L1 in the embodiment of this invention.

The curvature of an ellipsoid can be defined by three axes thereof. In the embodiment of this invention, the three axes of the hemi-ellipsoid 200 are the first distance L1, the second distance L2, and the fourth distance L4 as illustrated in FIG. 3A. The hemi-ellipsoid 200 of the embodiment is like a half, thin and long ellipsoid since the first distance L1 and the fourth distance L4 are longer than the second distance L2.

The interface 210 is interposed between the two hemi-ellipsoids 200 and connects to the minor axis 242 of the bottom surface 220 of each hemi-ellipsoid 200. Therefore, the shortest distance from the center 222 to the interface 210 is shorter than the distance from the center 222 to the edge of the bottom surface 220 along the minor axis 242, which means the third distance L3 is shorter than the second distance L2.

The largest height of the interface 210 is related to the distance between the interface 210 and the center 222 in the bottom surface 220, which means the third distance L3 is related to the fifth distance L5. The shorter the third distance L3 is, the longer the fifth distance L5 is. In particular, when the third distance L3 is shorter, the interface 210 is closer to the top point 232 and the center 222. Therefore, the fifth distance L5 is longer and is approaching to the fourth distance L4. Since the fifth distance L5 is shorter than the fourth distance L4, the third distance L3 should not be equal to zero.

As the above, the third distance L3 is ranging from zero to the second distance L2. In a preferred embodiment, the third distance L3 is shorter than or equal to half of the second distance L2 to have a better light distribution.

Please refer to FIG. 2. The light guide plate 110 may be in a shape of a flat rectangular parallelepiped. A plane of the light guide plate 110 contacting or right next to the LEDs 120 is called an incidence plane 112. The incidence plane 112 can be rectangular and has a longer side 116 and a shorter side 118. The direction of the longer side 116 represents the extension direction of the light guide plate 110, and the length of the shorter side 118 represents the thickness of the light guide plate 110. The light guide plate 110 has an emergent plane 114 adjacent to the incidence plane 112. In the embodiment of this invention, the emergent plane 114 is connected to and substantially perpendicular to the incidence plane 112.

Please refer to FIG. 2 and FIG. 3A. The incidence plane 112 of the light guide plate 110 is directly next to or contacted to the ellipsoidal surfaces 230 of the light directing structure 124 of the LED 120. The bottom surface 220 of each hemi-ellipsoid 200 is substantially parallel to the incidence plane 112. The major axis 240 of each bottom surface 220 is substantially parallel to the longer side 116 of the incidence plane 112, and the minor axis 242 is substantially parallel to the shorter side 118. The interface 210 is substantially parallel to the emergent plane 114 and substantially perpendicular to the incidence plane 112.

In the embodiment of this invention, the LEDs 120 are arranged along the longer side 116 of the incidence plane 112 and spaced apart from each other with gaps. As the above, light emitted from the LEDs 120 must have enough brightness to cover the gap between the adjacent LEDs 120. Therefore, the light field in large angle of the LED 120 is enough to cover the gap in the horizontal direction, which is parallel to the major axis 240 and the longer side 116 as the X-axis illustrated in FIG. 2. The angular distribution of light field can be broader along the direction of the major axis 240 to prevent dark strips formed in the gaps.

As the light guide plate 110 becomes thinner, the shorter side 118 of the incidence plane 112 also becomes shorter. Therefore, the light field of the LED 120 should be converged in the vertical direction to ensure that each light beam is incident on the light guide plate 110 to prevent light leakage problems. In other words, the light directing structure 124 may direct light emitted from the LED chip 122 and limits light field to a small angle along the direction of the minor axis 242.

Figure 4:
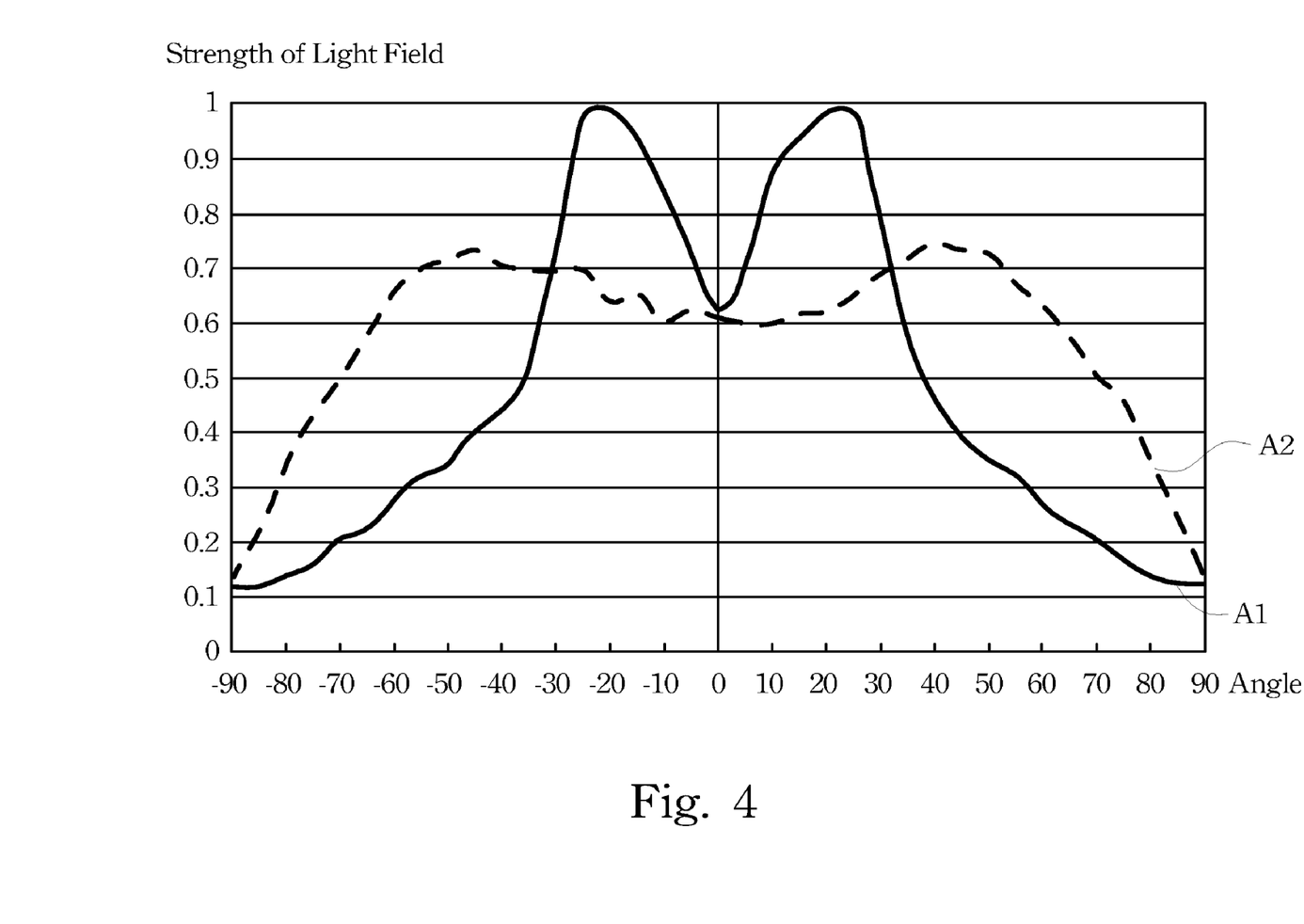
FIG. 4 is a plot of an angular distribution of light field of the light directing structure shown in FIG. 2.

Please refer to FIG. 3A and FIG. 4. FIG. 4 is a plot of an angular distribution of light field of the light directing structure 124. The angular distribution of the light field plot represents relations between light field and angle of light directed from the ellipsoidal surface 230 of the light directing structure 124.

A transverse axis of the angular distribution of light field plot represents angle. When perpendicular to the bottom surface 210 of the light directing structure 124, the angle is defined as 0 degree. When turning clockwise toward the edge of the bottom surface 210, the angle becomes bigger. When parallel to the bottom surface 210, the angle is defined as 90 degrees. On the contrary, when turning counter-clockwise toward the edge of the bottom surface 210, the angle becomes negative and becomes smaller. When parallel to the bottom surface 210, the angle is defined as −90 degrees. Please notice that the angle described later may be positive though, the angle should be treated as the positive angle and the negative angle with symmetry.

A longitudinal axis of the angular distribution of light field plot represents the strength of the light field after being normalized, which means a ratio of measurement value to the maximum measurement value of the light field.

Figure 5A:
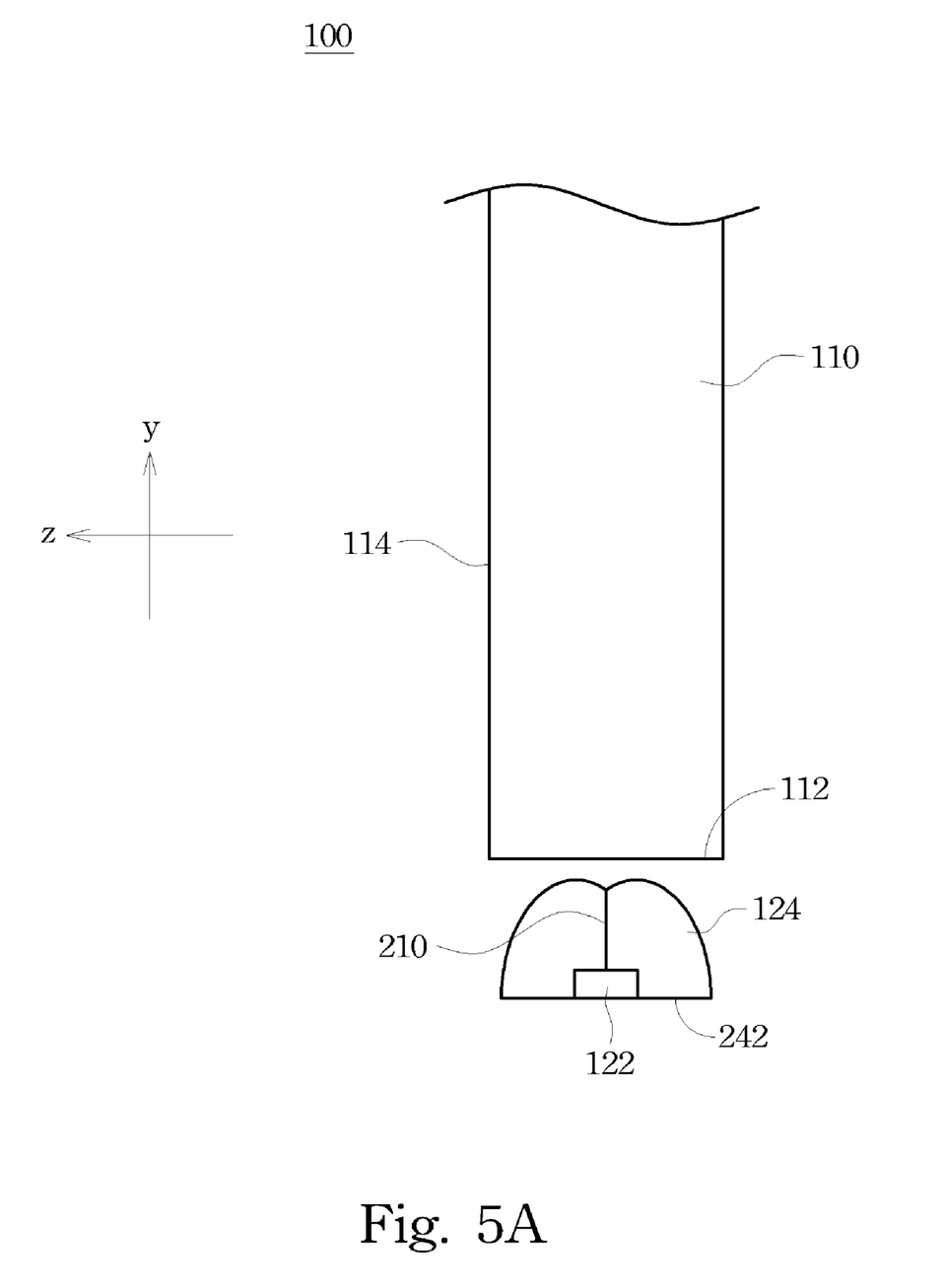
FIG. 5A is a side view of the backlight module shown in FIG. 2.

Please refer to FIG. 4 and FIG. 5A. FIG. 5A is a side view of the backlight module 100 shown in FIG. 2. Two curves are illustrated in the angular distribution of light field plot. A first curve A1 represents an angular distribution of the light field in a direction parallel to the minor axis 242, which means the relation of light field and angle in vertical direction (Z-axis).

As the plot shows, the strength of the light field is about above 0.4 between 0 degrees and 40 degrees. When the angle is larger about 40 degrees, the strength of the light field decreases dramatically. Therefore, light being directed by the light directing structure 124, along the minor axis 242, may limit the strength of light field in a small range of angles to make light field converged and prevent light leakage problems.

Figure 5B:
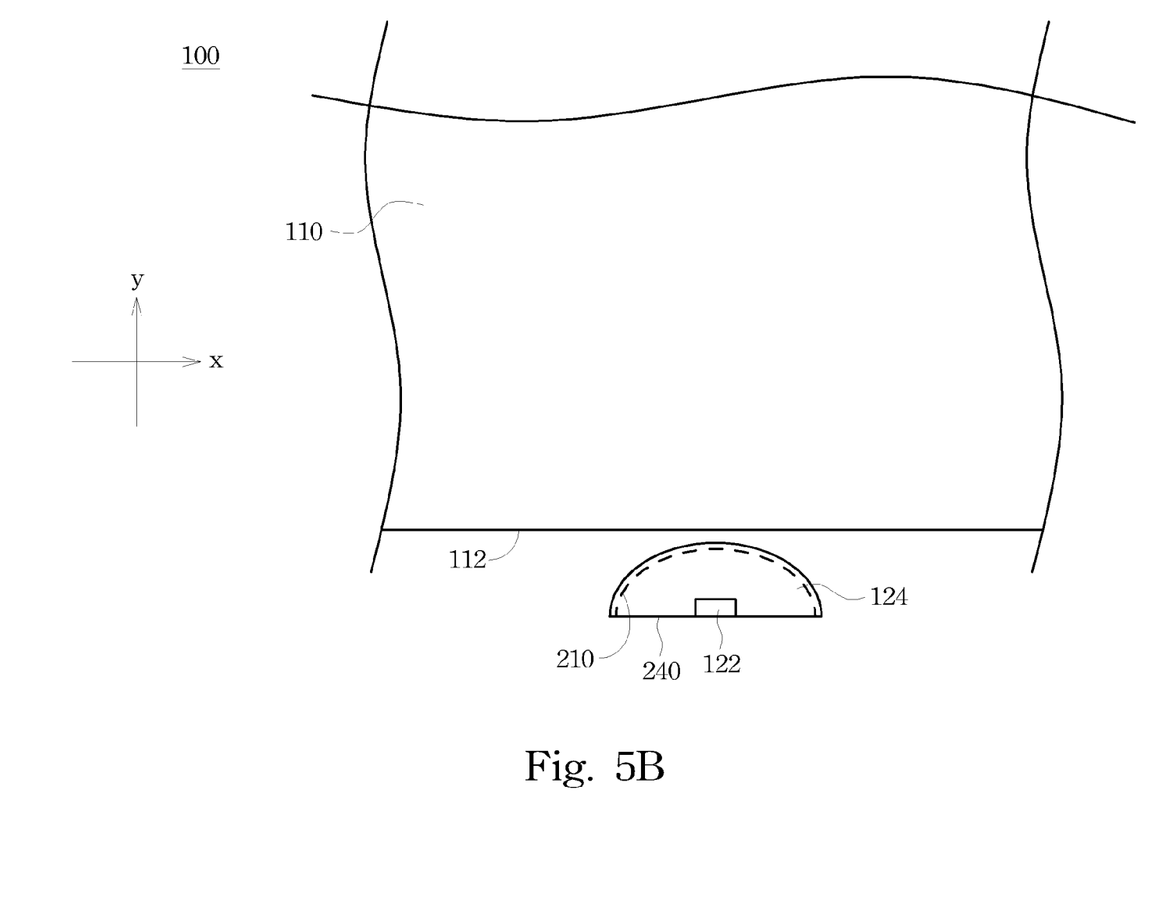
FIG. 5B is a top view of the backlight module shown in FIG. 2.

Please refer to FIG. 4 and FIG. 5B. FIG. 5B is a top view of the backlight module 100 shown in FIG. 2. A second curve A2 illustrated in the plot represents an angular distribution of light field in a direction parallel to the major axis 240, which means the relation of light field and angle in the horizontal direction as the direction of the X-axis illustrated in FIG. 5B.

As the plot shows, the strength of the light field is about above 0.6, which represents the strength of the light field is about above 60% of the maximum measurement value of the light field, between 0 degrees and 60 degrees. When the angle is equal to about 70 degrees, the strength of the light field is about 0.5, which means half of the maximum measurement value of light field. Therefore, light directed by the light directing structure 124 may improve the strength of light field at large angles. Therefore, the LED 120 is able to incident in a broad range of angles to prevent dark strips.

Figure 6:
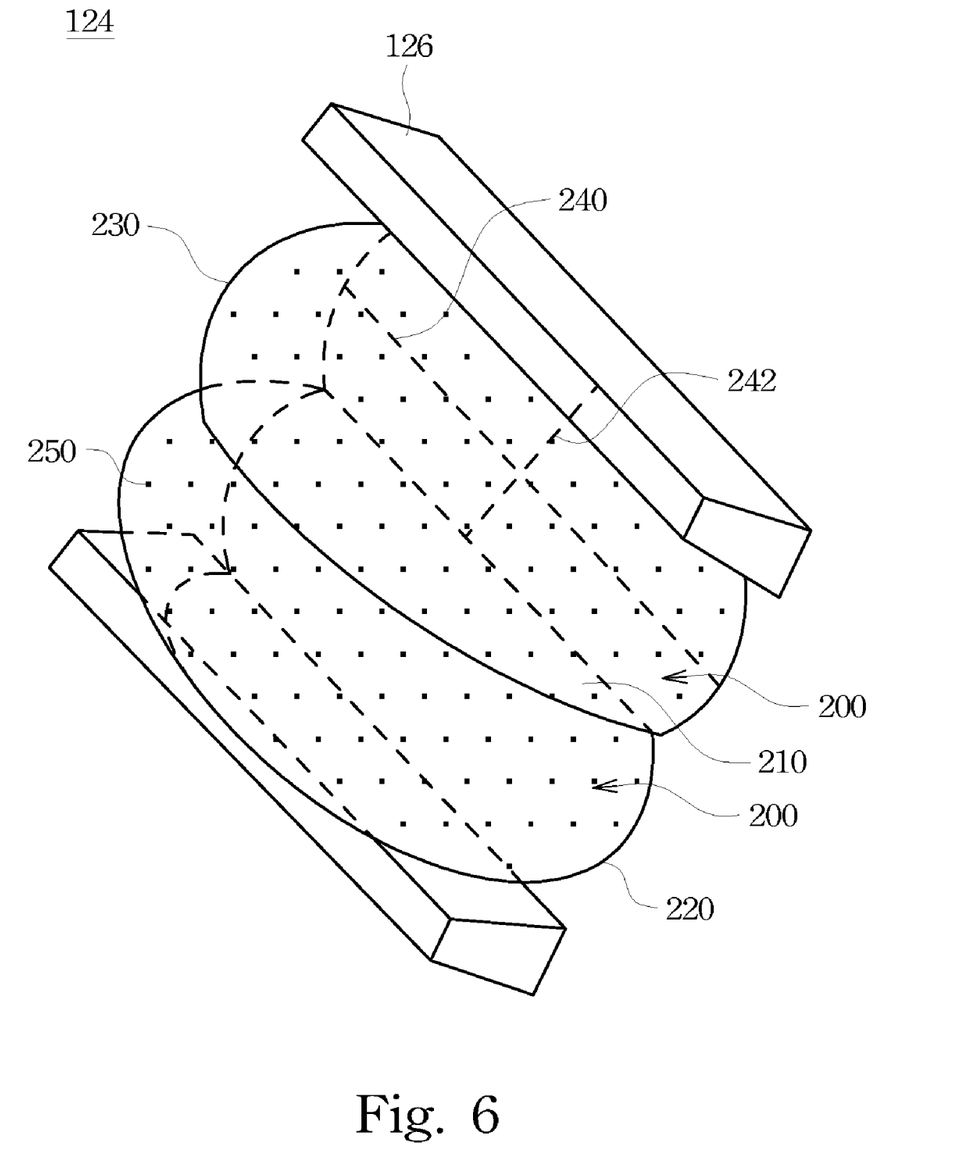
FIG. 6 is a perspective view of a light directing structure according to another embodiment of this invention.

Referring to FIG. 6, which is a perspective view of a light directing structure 124 according to another embodiment of this invention. In the embodiment of this invention, the light directing structure 124 further has light guidance 126 to converge light in the vertical direction to improve light utilization efficiency.

The light guidance 126 are located at a region on the ellipsoidal surface 230, especially at where the ellipsoidal surface 230 connects the minor axis 242 on the bottom surface 220.

There are many different types of light guidance 126. For example, the light guidance 126 may be made of high reflectance material with a coating such as a reflective layer like a metal coating film, or a multi-layer coating film. Additionally, the light guidance 126 may comprise a reflecting pattern such as a dot pattern. The light guidance 126 may change its structure to reflect or to refract light, such as grating structures, V-cut structures, or other micro-structures, which can help guide light to the front of the light directing structure 124. The invention is not limited to the above description, and it may be adjusted according to the actual requirements.

The light directing structure 124 may comprise optical material such as transparent plastic material like polymethylmethacrylate (referred to as PMMA), polyethylene terephthalate (referred to as PET), poly carbonate (referred to as PC), and combinations thereof. In addition, the light directing structure 124 may comprise transparent resins such as silicone, epoxy, and combinations thereof. In a preferred embodiment, the light directing structure 124 comprises encapsulant material. The light directing structure 124 may be formed by shaping the encapsulant during a packaging process. The light directing structure 124 may be formed after the packaging process in other embodiments.

Please refer to FIG. 6. The light directing structure 124 comprises many micro-particles 250 disposed therein. The micro-particles 250 may comprise fluorescent material or phosphorescent material, which may absorb light emitted from the chip and generate different wavelengths of light. The micro-particles 250 may comprise diffusive particles to help diffuse light or may comprise heat dissipative particles to help dissipate heat generated from the chip. The micro-particles 250 may be added in encapsulant, and the encapsulant may be shaped to form the light directing structure 124 during a packaging process.

In the foregoing, the angular distribution of light field is related to the shape and the displacement of the light directing structure 124. This invention discloses many embodiments and the light directing structure 124 thereof. By designing the light directing structure 124 having two connected hemi-ellipsoid 200, the angular distribution of light field in the horizontal direction and the vertical direction are different. In particular, the light field of large angle may be increased to prevent dark strip in the horizontal direction. In the vertical direction, the light field may be limited to a small angle, which may prevent light leaking Although the present invention has been described in considerable detail with reference certain embodiments thereof, other embodiments are possible. Therefore, their spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light emitting diode, comprising:
   a light emitting diode chip; and
   a light directing structure disposed on the light emitting diode chip and comprising a pair of connected hemi-ellipsoids and an interface interposed therebetween, wherein each hemi-ellipsoid comprises:
   a bottom surface, connected to the interface, in a shape of an incomplete ellipse having a major axis and a minor axis intersected to define a center, wherein the interface is substantially perpendicular to the minor axis; and
   an ellipsoidal surface connected to the bottom surface and the interface, a largest vertical distance from the ellipsoidal surface to the bottom surface being longer than a largest height of the interface.

2. The light emitting diode of claim 1, wherein the bottom surface is mirror symmetric and the minor axis is the line of symmetry.

3. The light emitting diode of claim 1, wherein a first distance is from the center to the edge of the bottom surface along the major axis, a second distance is from the center to the edge of the bottom surface along the minor axis, and the largest vertical distance from the ellipsoidal surface to the bottom surface is longer than the second distance.

4. The light emitting diode of claim 3, wherein the first distance is longer than or equal to twice of the second distance.

5. The light emitting diode of claim 3, wherein the largest vertical distance from the ellipsoidal surface to the bottom surface is longer than or equal to twice of the second distance.

6. The light emitting diode of claim 3, wherein a third distance is the shortest distance from the center to the interface, and the third distance being shorter than the second distance.

7. The light emitting diode of claim 6, wherein the third distance is shorter than or equal to half of the second distance.

8. The light emitting diode of claim 1, wherein the light emitting diode chip is embedded in the light directing structure.

9. The light emitting diode of claim 1, wherein the light directing structure comprises encapsulant material.

10. The light emitting diode of claim 1, wherein the light directing structure comprises a plurality of micro-particles embedded therein.

11. The light emitting diode of claim 1, wherein the light emitting diode chip is disposed at where the bottom surface connected the interface.

12. The light emitting diode of claim 1, further comprising at least a light guidance disposed on the ellipsoidal surface of the light directing structure, wherein the light guidance is disposed on the ellipsoidal surface near where the ellipsoidal surface connects the minor axis of the bottom surface.

13. The light emitting diode of claim 12, wherein the light guidance is a metal coating film, a reflecting pattern, a multi-layer film, a reflective film, a grating structure, a V-cut structure, or micro-structures.

14. The light emitting diode of claim 1, wherein the hemi-ellipsoids are mirror symmetric and the interface is the plane of symmetry.

15. A backlight module, comprising:
   a light guide plate; and
   a light emitting diode adjacent to the light guide plate and comprising:
   a light emitting diode chip; and
   a light directing structure disposed on the light emitting diode chip and interposed between the light emitting diode chip and the light guide plate, the light directing structure comprising a pair of connected hemi-ellipsoids and an interface interposed therebetween, wherein each hemi-ellipsoid comprises:

a bottom surface, connected to the interface, in a shape of an incomplete ellipse having a major axis and a minor axis intersected to define a center, wherein the interface is substantially perpendicular to the minor axis; and an ellipsoidal surface connected to the bottom surface and the interface, a largest vertical distance from the ellipsoidal surface to the bottom surface being longer than a largest height of the interface.

16. The backlight module of claim 15, the bottom surface is substantially parallel to an incidence plane of the light guide plate.

17. The backlight module of claim 15, wherein the interface is substantially parallel to an emergent plane of the light guide plate.

18. The backlight module of claim 15, wherein the light emitting diode chip is disposed at where the bottom surface connected the interface.

19. The backlight module of claim 15, wherein a first distance is from the center to the edge of the bottom surface along the major axis, a second distance is from the center to the edge of the bottom surface along the minor axis, and the largest vertical distance from the ellipsoidal surface to the bottom surface is longer than the second distance.

20. The backlight module of claim 19, wherein the largest vertical distance from the ellipsoidal surface to the bottom surface is longer than or equal to twice of the second distance.

21. The backlight module of claim 19, a third distance is the shortest distance from the center to the interface, and the third distance being shorter than the second distance.

22. The backlight module of claim 21, wherein the third distance is shorter than or equal to half of the second distance.

* * * * *